Figures 1, 2:
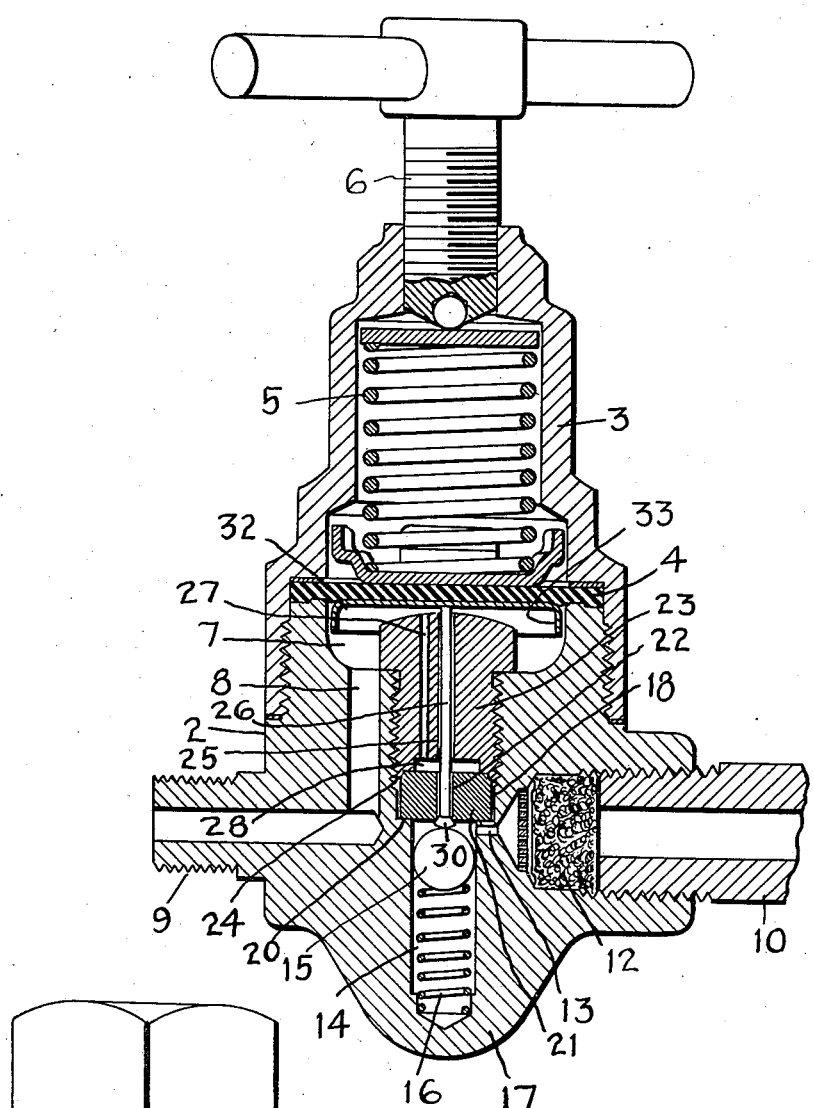

July 28, 1936.   G. M. DEMING   2,049,382
PRESSURE REGULATOR
Filed Sept. 1, 1934

INVENTOR
George M. Deming
BY
ATTORNEY

Patented July 28, 1936

2,049,382

UNITED STATES PATENT OFFICE 2,049,382

PRESSURE REGULATOR

George M. Deming, East Orange, N. J., assignor to Air Reduction Company, Incorporated, New York, N. Y., a corporation of New York Application September 1, 1934, Serial No. 742,403

3 Claims. (Cl. 50—23)

This invention relates to gas pressure regulators of the inverse type, that is to say, regulators in which the valve element closes in the direction in which the gas pressure acts. Pressure regulators embodying the invention are well suited for service involving high pressures and low flows, though the invention is not limited in this respect. These regulators may be used either to control directly the reduced pressure of a consumption flow, or as pilot regulators for pilot-controlled regulators.

Objects of the invention are to attain remarkable simplicity of construction, fewness and cheapness of parts, and low cost of manufacture, and yet to provide a regulator capable of giving excellent regulation and long service. The valve movements are slight and must take place with exactitude. It is an object of the invention to secure accuracy and reliability of action without the necessity for especially accurate manufacturing work. Though certain of the parts are delicate in themselves, provisions have been sought which result in sturdiness, and obviate binding on the one hand or any detrimentally loose play on the other hand. Regulators made in accordance with this invention may be very small and compact.

In the regulator herein disclosed a simple, headed pin is made to serve as a valve element and thrust piece extending into thrust relationship to the diaphragm. This pin extends through a port of a seat held in the body of the regulator, the head of the pin coacting with the inlet end of such port. The pin is preserved from bending by means of a plug having a long, narrow guide passage. This plug also serves to hold the seat in position. The pin, a spring tending to seat the head of the pin against the inlet of the seat port, and an intermediate guided element are in thrust relationship to one another, the arrangement being such that the delicate pin and the delicate seating surface of the seat, around the valve port, are not severely strained by reason of any lack of alinement between the guides for the pin and the intermediate element. Such lack of perfect alinement must be tolerated in any practical manufacturing operations. The intermediate element bears freely against the head end of the pin, and presents a convex surface thereto. A smooth metal ball guided by the wall of a chamber of the body serves admirably as the intermediate element, is cheap, and its use avoids any excessive friction and contributes to the end of keeping the head of the pin true to the port of the seat.

These and other features, objects and advantages of the invention will be apparent from the detailed description of the preferred embodiment of the invention and from the accompanying drawing.

In the said drawing:

Fig. 1 is a longitudinal section through a regulator embodying the invention, and Fig. 2 is an elevation of a plug element, a portion of this element being broken out and in section.

The regulator shown in the drawing has a body 2 and a spring case 3, between which a diaphragm 4 is clamped at its margin. Within the case 3 there is an adjusting spring 5 acting upon the outer side of the diaphragm, the pressure of this spring being adjustable by a screw 6.

The body 2 is formed with a low-pressure or reduced-pressure cavity 7 at the under side of the diaphragm, the gas passing from this cavity through a passage 8 to the delivery connection 9.

The inlet or high pressure connection 10 is screwed into a lateral socket 11 of the body containing a filter 12 and connected by a port 13 with a cylindrical, axial chamber 14 bored in the rear portion of the body. Guided in this chamber there is a steel ball 15 constituting the preferred species of intermediate element to which reference has already been made. A helical spring 16 in the chamber exerts thrust upon the ball. The chamber 14 is closed at the rear end by the integral wall of the body, no plug or cap which must be kept tight against high gas pressure being required as a back closure. In manufacture, all the axial boring of the regulator body is done from the low-pressure side (cavity 7), leaving the back 17 of the body intact. Likewise the valve parts are assembled in the body from the low-pressure side, and are removable through that side upon disconnection of the spring case 3.

An enlarged counter-bore 18 in the body, coaxial with the guide chamber 14 and between this chamber and the cavity 7, forms a shoulder 20 against which a seat 21 of hard rubber or other slightly yielding, elastic material is held, this seat being a short cylindrical piece having a port 22 through its center. All the upper portion of the counter-bore 18 is threaded to receive a metal plug 23, which is screwed into its socket from the low-pressure side. This plug holds the seat 21 against the shoulder 20, and in addition it has a suitably dimensioned and internally chamfered skirt 24 which insures that the port 22 through the seat is accurately alined with a guide passage 25 through the center of the plug.

The passage 25 guides a long, slender valve pin 26, the shank of which also passes with considerable freedom through the seat port 22. The guide passage 25 encircles the shank of the pin throughout a major portion of its length, extending from a point near the seat 21 to a point near the diaphragm 4. While bending or binding of the pin is precluded, the guide passage 25 need not be especially close in diameter to the diameter of the pin; indeed the entire gas flow may be discharged through this passage after passing through the port 22. It is best, however, that the passage 25 through the plug be not too large, and since the gas passageway through the plug 23 should be freer than the gas passageway through the seat, it is desirable that a special or additional discharge port 27 be drilled through the plug, outside the passage 25. The rear or lower end of the plug 23 is formed with a recess 28 which allows the gas, after escaping through the valve port 22, to reach the discharge port 27.

The valve pin 26 has upset thereon, at its rear or lower end, a head 30 having a beveled shoulder slanting to the junction with the shank. This head and shoulder serve admirably as a movable valve element to coact with the entrance end of the port 22 through the seat 21. The outer face of the head, which is preferably convex as shown, bears against the ball 15 and vice versa. The pin, which thus receives the thrust of the so-called marginal spring 16 through the intermediate element 15, extends through the seat 21 and the plug 23 into thrust relationship to the diaphragm 4 and, back of the diaphragm, the adjusting or regulating spring 5. It will be understood that when the regulated pressure in the cavity 7 tends to decline, the lessened gas pressure against the diaphragm permits the relatively powerful spring 5 to open the valve slightly wider, overcoming the spring 16, whereas if the delivery pressure of the regulator tends to rise, the increase of gas pressure against the diaphragm overcomes the spring 5 and permits the spring 16 plus the high inlet gas pressure to move the head 30 of the valve pin closer to the entrance of the port 22.

The simplicity of this design of regulator is evidenced by the fact that pins of the household type, having had their points clipped off, have proved to be entirely satisfactory valve pins.

The thrust plate, already mentioned as being interposed between the valve pin and the diaphragm, is designated by the numeral 32. It is a sheet metal disc of a diameter a little less than the diameter of the low-pressure cavity 7 in which it is disposed, and consists of a stamping having a peripheral flange 33 turned away from the diaphragm and adjacent the bonding wall of the cavity. This plate, without any connection, other than thrust contact, with the diaphragm, keeps the diaphragm from exerting lateral strain on the pin.

While the preferred embodiment of the invention has been described with particularity, it will be understood that changes in detail may be made.

I claim:

1. A pressure regulator of the inverse type, having a body, a diaphragm, a ported seat held in the body, a slender valve pin extending through the port of said seat into thrust relationship to said diaphragm, said pin having a small head coacting with the inlet end of said port, a spring in the body behind the valve pin, and a spherical ball guided in the body and urged by said spring against said pin, said ball being in direct contact with said spring and with said pin.

2. A pressure regulator of the inverse type, having a diaphragm, a body provided with a guide chamber, a ported seat held in the body, a valve element coacting with the inlet end of the port of said seat and associated with means extending into thrust relationship with the diaphragm, a spherical ball guided by direct contact with the wall of said guide chamber and bearing against said valve element, and a spring behind said ball and urging the same against said valve element.

3. A pressure regulator of the inverse type, comprising a body having a guide chamber, a diaphragm, a ported seat, a guide plug inserted in the body and having a long, narrow guide opening, a slender valve pin extending through the port of said seat and through said guide opening into thrust relationship to said diaphragm and having a head at its rear end coacting with the inlet end of said port, a spring, and a spherical ball guided by the wall of said guide chamber and interposed between said spring and the head of said valve pin, said plug holding said seat against a shoulder of the body and having an internally tapered skirt engaging and centralizing said seat.

GEORGE M. DEMING.